United States Patent [19]

Araki et al.

[11] Patent Number: 4,788,166

[45] Date of Patent: Nov. 29, 1988

[54] HIGH-HARDNESS SINTERED ARTICLE AND METHOD FOR MANUFACTURE THEREOF

[75] Inventors: Masatada Araki, Handa; Yutaka Kuroyama, Aichi, both of Japan

[73] Assignee: Nippon Oils & Fats Co., Ltd., Tokyo, Japan

[21] Appl. No.: 834,805

[22] Filed: Feb. 28, 1986

[30] Foreign Application Priority Data

Mar. 4, 1985 [JP] Japan .................................. 60-41190

[51] Int. Cl.⁴ ............................................. C04B 35/58
[52] U.S. Cl. ....................................... 501/96; 51/307; 75/234; 75/249
[58] Field of Search .............. 501/96; 51/307; 75/234, 75/249

[56] References Cited

U.S. PATENT DOCUMENTS

| | | | |
|---|---|---|---|
| 4,334,928 | 6/1982 | Hara et al. | 75/239 X |
| 4,343,651 | 8/1982 | Yazu et al. | 75/239 X |
| 4,566,905 | 1/1986 | Akashi et al. | 75/244 |

FOREIGN PATENT DOCUMENTS

| | | | |
|---|---|---|---|
| 55-119150 | 9/1980 | Japan | 501/96 |
| 55-113859 | 9/1980 | Japan | 501/96 |

OTHER PUBLICATIONS

*Modern Ceramic Engineering*, D. W. Richerson (1982), pp. 220–223.

*Primary Examiner*—Steven Capella
*Attorney, Agent, or Firm*—Oblon, Fisher, Spivak, McClelland & Maier

[57] ABSTRACT

A high-hardness sintered article having high-pressure phase boron nitride as its matrix is manufactured by preparing a mixture consisting of 65 to 95% by volume of a high-pressure phase boron nitride formed of boron nitride of cubic phase having a continuous grain size distribution ranging fom a maximum grain size of 10 to 50 μm to a minumum grain size of less than 1 μm and optionally admixed with wurtzite type boron nitride, 4 to 34% by volume of carbide, nitride or carbonitride of titanim alone or in conjunction with carbide, nitride, or carbonitride of tantalum, and the balance to make up 100% by volume of aluminum and sintering the mixture at a temperature of at least 1,200° C. under pressure of at least 20,000 atmospheres. A high-hardness sintered article is obtained without entailing any loss of hardness during the course of sintering by additionally incorporating in the mixture as 100% 0.1 to 5% by volume of boron and treating the resulting mixture under entirely the same conditions as described above.

9 Claims, 6 Drawing Sheets

FIG_3

FIG_4

FIG_5

FIG_7

FIG. 6

FIG_8

FIG_9

HIGH-HARDNESS SINTERED ARTICLE AND METHOD FOR MANUFACTURE THEREOF

FIELD OF THE INVENTION AND RELATED ART STATEMENT

This invention relates to a high-hardness sintered article and to a method for the manufacture thereof, and more particularly to a high-hardness sintered article useful as a material for tools serving to cut steel members of high hardness at a high speed and cut members of cast iron, cast steel, and mild steel with an efficiency higher than can be attained by any conventional tool and as a material for contact and frictional surfaces of various members required to resist abrasion for a long time and to a method for the manufacture of a high-hardness sintered article, which permits the high-hardness sintered article described above to be produced at relatively low sintering pressure and temperature.

Sintered articles containing cubic phase boron nitride (hereinafter referred to as "CBN" for short and wurtzite type boron nitride (hereinafter referred to as "WBN" for short) have been known to the art. The cutting tools and members containing such sintered articles as their main components offer highly efficient cutting and exhibit resistance to abrasion as compared with sintered articles not containing CBN and/or WBN. Because of this advantage, their range of application has been rapidly expanding in recent years.

First, sintered articles containing CBN and WBN (hereinafter referred to collectively as "high-pressure phase boron nitride") according to prior art will be described.

The specification of Japanese Patent Publication SHO 39(1964)-8948 discloses a sintered article which is a bound mass of CBN particles formed solely of CBN or a mixture of CBN with 3 to 30% by weight of an additive selected from aluminum oxide, beryllium, tungsten, molybdenum, nickel, copper, chromium, manganese and titanium.

In the specification of Japanese Patent Public Disclosure SHO 49(1974)-44014, there are disclosed a sintered article formed of WBN and ceramic and a method for the manufacture thereof. The Public Disclosure states that a continuous phase of WBN is obtained when the WBN content is large and a continuos phase of ceramic is obtained when the ceramic content is large. It is also mentioned that optional coating of WBN with a metal such as aluminum or nickel is preferable.

The specification of Japanese Patent Public Disclosure SHO 50(1975)-82689 refers to abrasive particles selected from among CBN, diamond, and mixture thereof. Concerning CBN in the form of abrasive particles, there is described a shaped article obtained by binding a solvent substance selected from among aluminum, lead, tin, magnesium, lithium, and alloys thereof with a refractory substance such as boride, nitride, or silicide.

In the specification of Japanese Patent Public Disclosure SHO 56(1981)-77359, there is disclosed a sintered article which comprises 70 to 95% by volume of at least one ceramic substance selected from the group consisting of nitrides, oxides, borides, and carbides and containing 15 to 60% by volume of a high-pressure phase boron nitride consisting of 4 to 16% by volume of CBN and 96 to 84% by volume of WBN and at least one metal selected from among nickel, cobalt, chromium, manganese, iron, molybdenum, tungsten, vanadium, aluminum, magnesium, silicon, titanium, zirconium, and hafnium. This sintered article is said to be characterized by its ease of fabrication subsequent to the sintering step.

In the specification of Japanese Patent Publication SHO 57(1982)-49621, there is disclosed a high-hardness tool grade sintered article which has a CBN content of 80 to 20% by volume, has, as its first binding phase, a carbide, nitride, boride, or silicide of a transition metal of Group 4a, 5a, or 6a of the Periodic Table of Elements, a mixture thereof, or a solid solution thereof and, as its second binding phase, aluminum, silicon, nickel, cobalt, or iron, or an alloy or a compound containing any of the elements mentioned above, and has the first and second binding phases continued into each other to form a binding phase within the sintered texture thereof.

The sintered articles disclosed in the specifications cited above, however, have problems of practical use yet to be solved as follows.

In the production of a sintered article formed solely of CBN by the method disclosed in Japanese Patent Publication SHO 39(1964)-8984 the sintering has to be carried out under extremely harsh pressure and temperature conditions such as, for example, about 90,000 atmospheres and 2,100° C. The apparatus for working this method under the conditions of high pressure and high temperature, therefore, is subject to an extremely large load and can offer only a very short service life. This fact makes any attempt at commercializing the method substantially infeasible from the economic point of view.

This specification discloses a sintered article formed of CBN and an additive. When this additive is a metallic substance, the sintered article is not useful as a material for cutting tools which are required to withstand elevated temperatures and large stress while in actual service because the metallic substance has insufficient strength at elevated temperatures. This means that a desirable sintered article cannot be obtained simply by mixing CBN with such an additive as mentioned above and sintering the resultant mixture. When aluminum oxide is used as the additive or when aluminum oxide and a metal are added together, the produced sintered article is still deficient in performance.

The sintered article disclosed in Japanese Patent Public Disclosure SHO 49(1974)-44014 is obtained by admixing WBN of an extremely large surface area with ceramic and sintering the resultant mixture. Although WBN is an excellent material for hard sintered tools, it is generally produced instantaneously by the shock impact of an explosive substance, and not by crystalline growth. Therefore the individual WBN particles each constitute an aggregate of minute crystal grains some tens of nm in diameter. The particles themselves have no greater strength than their single crystals. Although the problem of strength encountered by these particles is eliminated by minute single crystals obtained by crushing these particles, the crushing of the particles inevitably results in an increase in the surface area of the boundary of contact between the WBN particles and the ceramic and metal added thereto within the sintered article. Since the strength of this boundary of contact is naturally lower than the strength of the WBN itself, the strength of the sintered article is lower than when the particles in the form of large single crystals are sintered. The sintered article disclosed in the specification possesses strength only limited.

Japanese Patent Public Disclosure SHO 50(1975)-82689 discloses a method for the manufacture of a sintered article. The additives claimed in this Disclosure embrace a very wide range. As a specific working example, a sintered article obtained by admixing 19.5% by weight of a combination of 32% by weight of aluminum and 68% by weight of silicon nitride with 80.5% by weight of CBN and sintering the resultant mixture is cited exclusively. As concerns the grain size of each of the components, the Disclosure says only "suitably not more than 40 microns, preferably not more than 12 microns". In the claims, this invention is portrayed as "a shaped abrasive article, characterized by having abrasive particles, namely CBN particles, mutually joined fast to each other with a matrix containing a solvent substance capable of dissolving the abrasive particles at least to a limited extent and a refractory substance". From this description, it is understood that the adjacent CBN particles in the shaped abrasive article are joined through the medium of the matrix comprising a specific solvent substance and a refractory substance. This shaped abrasive article nevertheless has certain, though limited, hardness.

The invention disclosed in the specification of Japanese Patent Public Disclosure SHO 56(1981)-77359 is characterized by using both CBN and WBN as the starting materials for the sintered article. Although the sintered article contains CBN and WBN in a total proportion of 15 to 60% by volume, the number of bond points between adjacent CBN particles, between adjacent WBN particles, or between CBN particles and WBN particlesis very small. As the result, the sintered article is characterized by possessing low hardness and yielding readily to a cutting work.

The high-hardness sintered article to which the present invention is directed is disclosed nowhere in any of the references cited above.

The invention disclosed in Japanese Patent Publication SHO 57(1982)-49621 is depicted by way of characterization as having the CBN particles found as much in the form of the first and second binding phases through the mutual union of the individual CBN particles as possible thereby conferring an excellent quality upon the produced sintered article. The bound phases mentioned above are literally excellent as bound phases of CBN particles and the sintered article obtained by this invention is also excellent. In this sintered article, similarly to that of the invention disclosed in Japanese Patent Publication SHO 56(1981)-77359, the number of bond points between the adjacent CBN particles is supposed to be extremely small. The strength of the sintered article is lower than that of the sintered article which has all adjacent CBN particles bound to each other. The sintered article, therefore, is not suitable for tools for cutting metals under heavy load or in the presence of impact.

The properties of the sintered articles obtained by the conventional techniques mentioned above may be summarized as follows:

1. Production of a high-pressure phase boron nitride sintered article of sufficient strength requires use of harsh conditions of extremely high pressure and temperature and proves disadvantageous from the economic point of view.

2. Incorporation of additives in high-pressure phase boron nitride helps to mitigate the conditions for the production of the sintered article. The produced sintered article, however, is deficient in strength.

3. In the conventional sintered article containing CBN and/or WBN, an attempt to attain mutual bonding of high-pressure phase boron nitride particles requires use of very high pressure and temperature in the treatment and increase of the high-pressure phase boron nitride content to an extent of exceeding 70% by volume, for example. In other words, sufficient mutual bonding of the high-pressure phase boron nitride particles cannot be obtained simply by increasing the amount of the high-pressure phase boron nitride to be added.

Heretofore, it has been customary for the high-hardness sintered article to be produced under harsh conditions of high temperature and high pressure. The high-pressure phase boron nitride, therefore, is deformed so much as to fill the gaps within the sintered article and bind the adjacent boron nitride particles to each other and give rise to a strongly bound aggregate.

Notwithstanding the conventional high-hardness sintered article, the desirability of developing a method for manufacturing a sintered article possessing at least the same properties as the conventional high-hardness boron nitride sintered article under more moderate conditions than the conventional method has been finding recognition.

OBJECT AND SUMMARY OF THE INVENTION

An object of this invention is to provide a high-hardness boron nitride sintered article possessing properties equivalent to or better than the properties of the conventional high-hardness boron nitride sintered article and a method for the manufacture of the aforementioned sintere article under more moderate conditions than the conventional method.

To accomplish the object described above, the high-hardness sintered article of this invention comprises (A) 65 to 95% by volume of one kind of high-pressure phase boron nitride selected from the group consisting of
  (a) a cubic phase boron nitride and
  (b) a mixture of a cubic phase boron nitride with a wurtzite type boron nitride,
(B) 4 to 34% by volume of one kind of additive selected from the group consisting of
  (a) at least one member selected from the group consisting of carbide, nitride, and carbonitride of titanium and
  (b) a mixture of at least one member selected from the group consisting of carbide, nitride, and carbonitride of titanium with at least one member selected from carbide, nitride, and carbonitride of tantalum, and
(C) the balance to make up 100% by volume of aluminum and unavoidable impurities, which high-hardness sintered article is characterized by the fact that the cubic phase boron nitride has a continuous grain size distribution ranging from a maximum grain size of 10 to 50 μm to a minimum grain size of less than 1 μm and the particles of the high-pressure phase boron nitride are bound to form a continuous matrix.

Further to attain the object described above, the method of this invention for the manufacture of the high-hardness sintered article comprises preparing a mixture consisting of (A) 65 to 95% by volume of one kind of high-pressure phase boron nitride selected from the group consisting of
  (a) a cubic phase boron nitride and (b) a mixture of a cubic phase boron nitride with a wurtzite type boron nitride, (B) 4 to 34% by volume of one kind of additive selected from the group consisting of (a) at least one member selected from the group consisting of carbide, nitride, and carbonitride of titanium and (b) a mixture of at least one member selected from the group consisting of carbide, nitride, and carbonitride of titanium with at least one member selected from carbide, nitride, and carbonitride of tantalum, and (C) the balance to make up 100% by volume of aluminum, and then sintering the mixture under conditions of at least 1,200° C. and 20,000 atmospheres thereby forming a continuous matrix made up of mutually bound high-pressure phase boron nitride particles.

The sintered article of the aforementioned composition additionally incorporating therein 0.1 to 5% by volume of boron based on said composition as 100% and the method for manufacture of the sintered article additionally incorporating therein boron as described above are also embraced in the present invention.

DESCRIPTION OF THE PREFERRED EMBODIMENTS

The inventors, after studying the problems encountered by the conventional techniques cited in the preceding section, came to the following conclusion. For the purpose of enhancing the strength of a sintered article containing a high-pressure phase boron nitride and mitigating the sintering conditions, it is necessary to increase the chances of mutual bonding between the adjacent high-pressure phase boron nitride particles.

For increasing the chances of mutual bonding between the particles, it suffices simply to use as fine high-pressure phase boron nitride particles as permissible. By simply using fine high-pressure phase boron nitride particles, however, the occurrence of various problems pointed out above with respect to the Japanese Patent Public Disclosure SHO 49(1974)-44014 cannot be precluded.

The inventors, as a result of various studies, ascertained that a sintered article produced from raw materials containing CBN and WBN in a specific voluminal ratio in the high-pressure phase boron nitride and incorporating therein an additive of a specific kind and a specific grain size possesses satisfactory properties as compared with the conventional sintered article. This knowledge led to perfection of the present invention.

The high-hardness sintered article of the present invention is desired to have the high-pressure phase boron nitride thereof composed of 70 to 95% by volume of cubic phase boron nitride and 5 to 30% by volume of wurtzite type boron nitride and to have the additive thereof selected from among carbide, nitride, and carbonitride of titanium and therefore allowed to form and retain titanium diboride ($TiB_2$) therein. Naturally, the aforementioned preferred phase composition of boron nitride and the requirement that the additive should be a specific compound of titanium apply to the sintered article of this invetion which additionally incorporates therein boron 0.1 to 5% by volume based on the composition as 100%.

Desirably, the high-pressure phase boron nitride in the mixture prepared during the course of the manufacture of the high-hardness sintered article of this invention comprises 70 to 95% by volume of cubic phase boron nitride and the balance to make up 100% by volume of wurtzite type boron nitride. Moreover, as the additive is a titanium compound, it is preferred that $TiB_2$ be formed during sintering so as to obtain a continuous matrix wherein $TiB_2$ is present in the high pressure phase boron nitride. The characteristics described above fully apply to the manufacture of a high-hardness sintered article from the mixture, i.e. the raw material prepared to be sintered, which incorporates therein boron at 0.1 to 5% by volume based on the aforesaid composition as 100%.

The expression "continuous grain size distribution" as used herein means that when all the particles of grain sizes ranging from the maximum grain size to the grain size of 1 μm are classified as stepped by the unit of 5 μm, at least one particle of a grain size belonging to a given class is contained in a total of 100 particles and that the number of particles of grain sizes not exceeding 1 μm account for not less than 10% of the number of particles of grain sizes not smaller than 1 μm.

Owing to the construction of this invention described above, the high-pressure phase boron nitride forms a matrix in the high-hardness sintered article of this invention and the additive comprising aluminum and at least one member selected from the group consisting of carbide, nitride, and carbonitride of titanium and at least one member selected from the group consisting of carbides, nitrides, and carbonitrides of titanium and tantalum plays the part of filling up the interstices in the matrix. The titanium compound enjoys a satisfactory sintering property and exhibits heat-resisting property and thermal conductivity satisfactorily during the work of cutting. In the present invention, in addition to being useful as materials for binding the high-pressure phase boron nitride in a continuous phase, the aforementioned compounds fill up the interstices among the high-pressure phase boron nitride particles and bind them together, whereby the matrix is formed. Titanium compounds generally have more than the stoichiometric amount of titanium, giving rise to excessive Ti bonding, so that during the course of sintering, the excess titanium in the titanium compounds reacts with aluminum and forms an intermediate compound between Ti and Al. Further during the course of sintering, the elemental titanium reacts with the high-pressure phase boron nitride on the boundary of the high-pressure phase boron nitride to form $TiB_2$. By the same token, the elemental aluminum forms aluminum nitride (AlN). These newly formed compounds produce powerful union of the adjacent high-pressure phase boron nitride particles by fastening them at the point of contact and enable the individual high-pressure phase boron nitride particles to join directly to one another and give rise to a three-dimensional matrix. Since the high-pressure phase boron nitride particles contained in the sintered article have grain sizes distributed over a wide range, the particles of varying grain sizes produce a tightly packed texture having particles of medium grain sizes wedged in between particles of large grain sizes and particles of small grain sizes driven in between particles of medium grain sizes. In this texture, the number of points of contact between the adjacent high-pressure phase boron nitride particles is far greater than that in the texture formed by using high-pressure phase boron nitride particles of grain sizes distributed over a narrow range. The matrix in the texture, therefore, enjoys improved strength. The AlN formed during the course of sintering functions as a sintering catalyst for CBN, enabling the high-pressure phase boron nitride particles in the method of this invention to be effectively sintered at extremely low temperature and pressure so as to form a high-hardness sintered article possessing a continuous matrix.

In the present invention, if the amount of the high-pressure phase boron nitride is less than 65% by volume, the matrix formed, if any, does not acquire sufficient strength. If this amount exceeds 95% by volume, then the amount of the binding phase is not sufficient. In either case, the high-hardness sintered article aimed at by this invention cannot be obtained.

The amount of the aforementioned compound selected from the group consisting of carbide, nitride, and carbonitride of titanium and carbides, nitrides, and carbonitrides of titanium and tantalum is limited to the range of 4 to 34% by volume for the following reason. The sum of the compound and aluminum accounts for the remainder of the high-pressure phase boron nitride. When the high-pressure phase boron nitride accounts for 95% by volume, the compound selected from the group consisting of carbide, nitride, and carbonitride of titanium and carbides, nitrides, and carbonitrides of titanium and tantalum must account for 4% by volume and aluminum for 1% by volume. When the high-pressure phase boron nitride accounts for 65% by volume, the compound selected from the group consisting of carbide, nitride, and carbonitride of titanium and carbides, nitrides, and carbonitrides of titanium and tantalum must account for a value in the range of 4 to 34% by volume and aluminum for a value in the range of 31 to 1% by volume. Thus, the observance of these specified ranges is indispensable to the production of the high-hardness sintered article aimed at.

The sintering of the prepared mixture is effectively carried out under the minimum conditions of 20,000 atmospheres and 1,200° C. No stable sintering is obtained under lower pressure. The produced sintered article fails to acquire sufficient strength when the sintering is carried out at a lower temperature.

Although this sintering may be carried out under the conditions of higher temperature and higher pressure than the respective values mentioned above, the actual sintering temperature and pressure can be fixed in accordance with the conditions of the apparatus adopted for the sintering. The pressure as one of the conditions for the sintering has no upper limit. The temperature as the other condition can be as high as desirable only so long as it does not surpass the lower limit at which the mixture causes no phase transition of the high-pressure phase boron nitride to the low-pressure phase boron nitride. By the addition of boron, the degradation of hardness suffered by the sintered article because of high temperature can be precluded.

Desirably, the proportion of WBN in the high-pressure phase boron nitride is not more than 30% by volume. The reason for this upper limit is as follows.

Coarse WBN particles do not possess so high strength as may generally be expected. When they are expected to offer strength normal for particles, their largest possible grain size ought to be fixed at 5 $\mu$m. From the practical point of view, it is advantageous to procure CBN particles of grain sizes exceeding 10 $\mu$m as a raw material, comminute the raw material and prepare CBN particles having a continuous grain size distribution ranging from the maximum grain size exceeding 10 $\mu$m to the minimum grain size of less than 1 $\mu$m, and use the prepared CBN particles in the production of the sintered article, for the purpose of saving the time spent in the size preparation of the raw material. It is also advantageous to add WBN for the purpose of increasing the content of high-pressure phase BN particles of grain sizes of not more than 1 $\mu$m. Since WBN is intended to compensate for the content of CBN particles of smaller grain sizes, it should desirably account for not more than 30% by volume based on the total volume of the high-pressure phase BN. When the CBN particles as the raw material are comminuted to prepare CBN particles of a continuous grain size distribution, the fractured surfaces of the comminuted CBN particles are fresh surfaces not yet exposed to the ambient air after the synthesis of the CBN. The fresh fractured surfaces prove desirable in the sense that since they are not polluted by the ambient air, possibility of their introducing impurities during the course of sintering is slight. The comminuted CBN particles, therefore, are desired to be preserved under a vacuum or under a blanket of an inert gas and prevented from exposure to the ambient air until the time of sintering. Optionally, the CBN particles having a continuous grain size distribution and useful for this invention may be obtained by combining a plurality of lots of CBN particles having different grain size distributions. The CBN particles having a continuous grain size distribution may be obtained by the use of a ball mill, a stamping mill, an edge runner, an attriter, or a vibration mill.

Now, the present invention will be described more specifically below with reference to working examples and comparative experiments.

EXAMPLE 1

In a ball mill made of carbide, a 3:1 mixture of CBN particles 15 μm in average grain size and CBN particles 5 μm in average grain size were comminuted and mixed for 4 hours. By treatment for water sedimentation classification and by observation under a microscope, the comminuted mixture consequently obtained was found to have a largest grain size of 18 μm, to contain particles of grain sizes of not more than 1 μm in a proportion of 23%, and to have particles of grain sizes greater than 1 μm in a continuous grain size distribution.

In a ball mill made of carbide, 72% by volume of the comminuted CBN mixture, 10% by volume of titanium carbide consisting of titanium and carbon in a molar ratio of 1:0.68, 4% by volume of tantalum carbide consisting of tantalum and carbon in a molar ratio of 1:1, 2.6% by volume of titanium nitride consisting of titanium and nitrogen in a molar ratio of 1:0.72, and 11.4% by volume of aluminum were mixed for 12 hours to produce a mixed powder.

In a cup-shaped cylindrical capsule made of industrial quality pure titanium and measuring 15 mm in outside diameter, 6 mm in height, and 0.8 mm in wall thickness, a carbide alloy powder containing 10% by weight of cobalt was placed to a height of 3 mm from the bottom and the aforementioned mixed powder was superposed in a thickness of 2 mm under pressure on the carbide powder. Then the open end of the cylindrical capsule was sealed with a disc of industrial quality pure titanium. The sealed capsule was enveloped with a mass of sodium chloride molded in a density of 98% of the theoretical density, inserted into a belt type super-high pressure device, gradually pressed and heated to 38,000 atmospheres and 1,520° C. over a period of 8 minutes, retained under the finally rached conditions for 20 minutes, allowed to fall gradually to normal room temperature and atmospheric pressure over a period of 12 minutes, and then removed from the pressure device.

When the capsule was removed by grinding, there was obtained a disc-shaped sintered article about 2.8 mm in thickness and about 12.3 mm in diameter. In the disc, the CBN-containing mixed powder and the carbide powder were sintered hard and formed two strongly joined layers.

Figure 1:
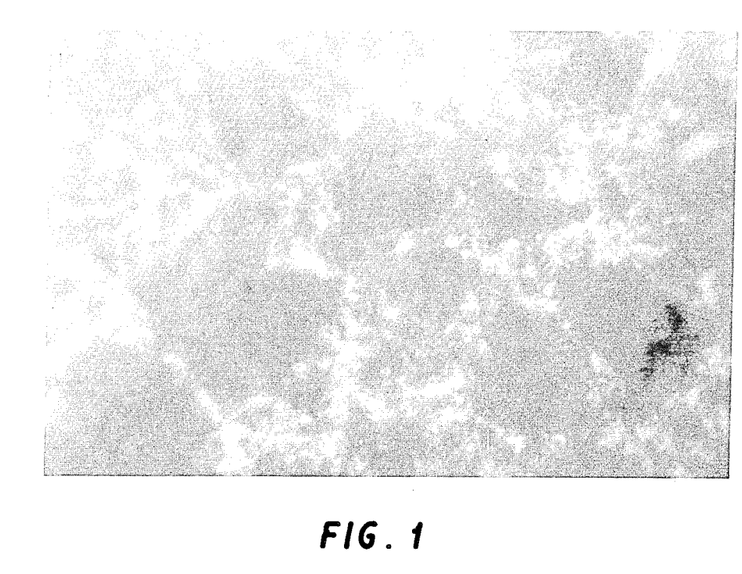
FIG. 1 is a photograph of the texture of a high-hardness sintered article of this invention prepared in Example 1, as taken through an optical microscope at 1,500 magnifications.

The CBN-containing sintered article was tested for hardness with a Micro-Vickers hardness tester under a load of 1 kg. The average of the measurements taken at five points was 4,020 kg/cm$^2$. The CBN-containing sintered article was abraded with diamond paste. Under an optical microscope at 1,500 magnifications, the abraded surface of the sintered article revealed a texture wherein the adjacent CBN particles were bound fast. A photograph of the texture of this sintered article taken through the optical microscope at 1,500 magnifications is shown in FIG. 1. In the photograph, the black portions are those of CBN and the white portions those of other components.

Figure 2:
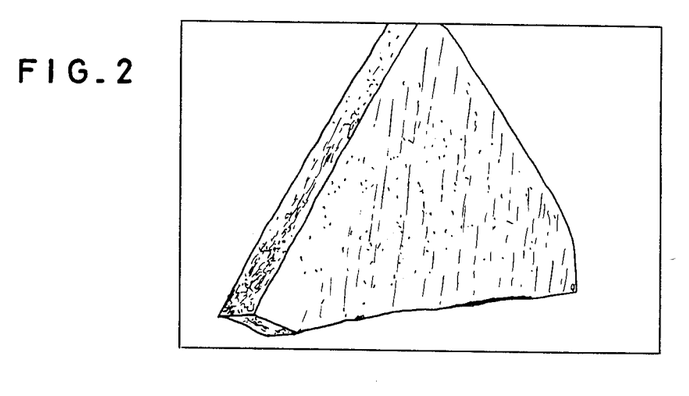
FIG. 2 is a diagram illustrating the condition assumed by the high-hardness sintered article of this invention prepared in Example 1 after immersion in a mixture consisting of hydrofluoric acid of a concentration 46% and nitric acid of a concentration of 35% in a voluminal ratio of 1:1, as drawn based on a photograph taken through a microscope at about 10 magnifications.

Then, the CBN-containing sintered article was immersed in a mixture consisting of hydrofluoric acid of a concentration of 46% and nitric acid of a concentration of 35% in a voluminal ratio of 1:1. The condition the sintered article assumed after the immersion, as drawn based on a photomicrograph of about 10 magnifications, is shown in FIG. 2. FIG. 2 clearly shows that the sintered article retained its shape even after the chemical treatment. When the sintered article after the chemical treatment was tested for hardness with the same Micro-Vickers hardness tester, the average of measurements taken at five points was 958 kg/mm$^2$, indicating that the adjacent CBN particles were still bound fast.

Figure 3:
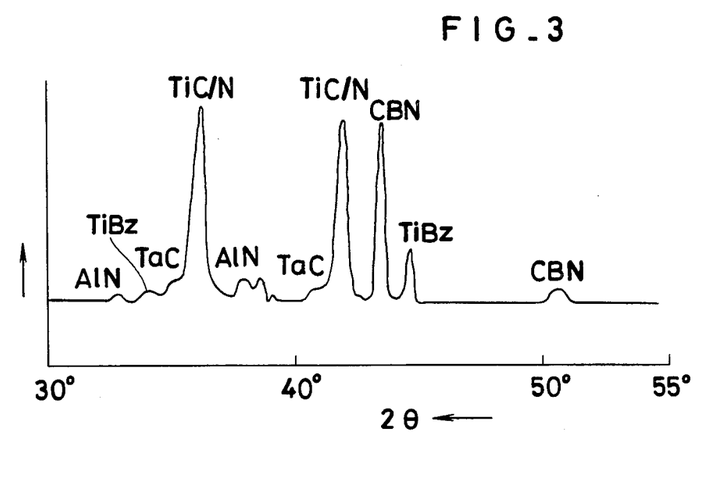
FIG. 3 is an X-ray diffraction diagram of the high-hardness sintered article of this invention of FIG. 1.
Figure 4:
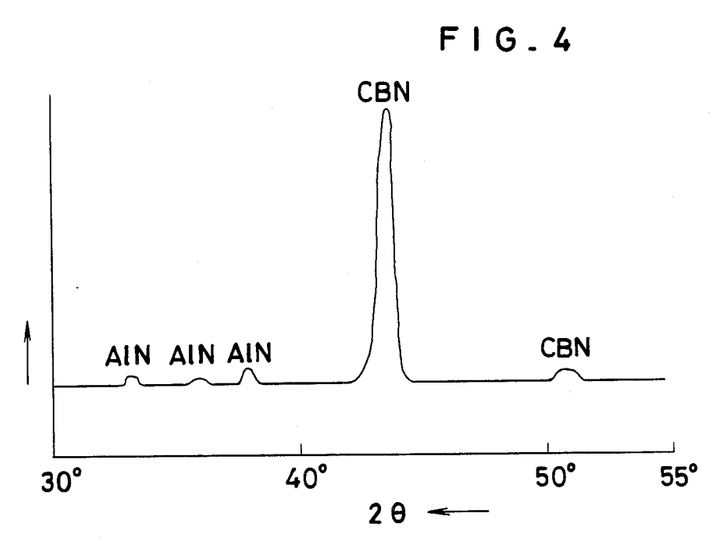
FIG. 4 is an X-ray diffraction diagram of the high-hardness sintered article of this invention of FIG. 2 after a chemical treatment.

The CBN-containing sintered article was subjected to X-ray diffraction analysis before and after the chemical treatment. The results are shown in FIGS. 3 and 4. In FIG. 3 showing the results before the chemical treatment, peaks of titanium carbonitride, titanium boride, and tantalum carbide are clearly identified. In FIG. 4 showing the results after the chemical treatment, these peaks are no longer visible and a strong peak of CBN and a weak peak of aluminum nitride are visible. From these results, it is noted that the high-hardness sintered article of this invention produced by the method of this invention comprises a continuous matrix resulting from the sintering of CBN particles of a continuous grain size distribution and a portion formed of titanium carbide, tantalum carbide, tantalum nitride, and aluminum.

The practical excellence of the high-hardness sintered article of this invention produced in Example 1 will be described below with reference to a case of using the sintered article as a cutting tool.

The disc-shaped sintered article obtained in Example 1 was finished with a diamond grindstone in dimensions of 11 mm in diameter and 2.5 mm in total thickness including about 1 mm of the thickness of the portion of the CBN-containing sintered article. The finished disc was cut with a diamond cutter into six equal sectorial tips of an included angle of 60° as defined by cutting lines passing through the center of the disc. The tips were joined to a carbide, type K20, with silver solder and abraded with a diamond wheel to produce throwaway tips having an included angle of 60°, an inscribed circle of 9.525 mm, and a nose R of 0.8 mm and designated as TNG 332.

As a material for trial cutting, a bar of steel, type SCM 415, having a diameter of 120 mm and a length of 500 mm and having a rectangular groove cut therein in a width of 20 mm and a depth of 20 mm and thermally treated to a hardness of 58 on the Rockwell C Scale was prepared. The aforementioned throwaway tips were used to cut the periphery of the material. The cutting was continued for 60 minutes under the conditions of peripheral speed (hereinafter referred to as V)=188 m/min, cutting depth (hereinafter referred to as d)=0.5 mm, and feed rate (hereinafter referred to as f)=0.2 mm/rcv. The maximum wear in the flank of the cutting tip was only 0.08 mm. The cutting tip showed absolutely no sign of cracking or chipping and was judged to be usable for continued cutting. The cutting method is generally referred to as the "interrupt cutting method". Conventional cutting tools of CBN-containing sintered article could not withstand the interrupt cutting test under the harsh conditions as employed in the test just described because they sustained breakage at their cutting edges in early stages of cutting.

COMPARATIVE EXPERIMENT 1

The procedure of Example 1 was faithfully repeated, except that CBN particles having an average grain size of 3 μm were used in their uncomminuted form and the treatment of mixing the CBN particles with additives was continued for 3 hours.

Figure 5:
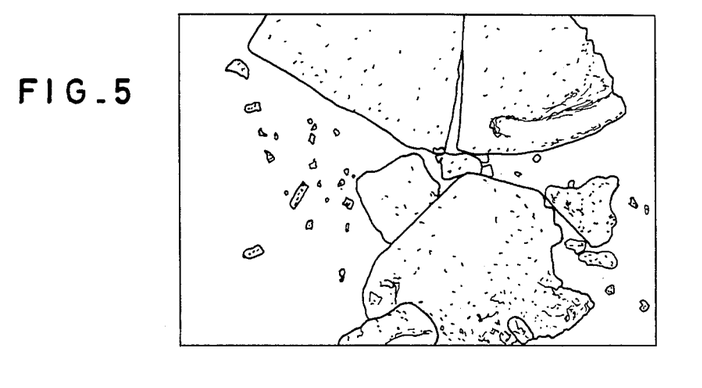
FIG. 5 is a diagram illustrating the condition assumed by a high-hardness sintered article prepared in a comparative experiment after immersion in the same mixture of hydrofluoric acid and nitric acid as in Example 1, as taken through a microscope at about 10 magnifications.

The hardness of the produced sintered article determined with a Micro-Vickers hardness tester (hereinafter referred to simply as "hardness") was 3,400 kg/mm², a value lower than the value of the sintered article of Example 1. This lower hardness is presumed to be because this sintered article lacked mutual bonding of adjacent CBN particles. Observation with an optical microscope has confirmed that, in the sintered article, the adjacent CBN particles are separated by a binding phase. The sintered article was subjected to a chemical treatment by the same method as used in Example 1. The condition the sintered article assumed after the chemical treatment, as drawn based on a photomicrograph taken at about 10 magnifications, is shown in FIG. 5. The photograph shows that the sintered article was disintegrated with the adjacent CBN particles separated from each other.

In the same cutting test as in Example 1, the sectorial tips showed breakage on the cutting edges within 2 minutes after starting the cutting. When the cutting test was repeated, the tips were broken within 1 minute 30 seconds.

COMPARATIVE EXPERIMENT 2

The procedure of Example 1 was faithfully repeated, except that all the additives were substituted by aluminum oxide. By observation under an optical microscope and by observation after chemical treatment, union of CBN particles was confirmed.

In the same cutting test as in Example 1, the tips showed a wear of 0.8 mm on the flank of the cutting edge within 18 minutes after starting the cutting and was no longer usable for interrupt cutting.

From Example 1 and Comparative Experiment 1, it is noted that in this invention it is very important that the CBN particles have a continuous grain size distribution. From Example 1 and Comparative Experiment 2, it is noted that the kinds of additives greatly influence on the bonding of CBN particles.

EXAMPLE 2

CBN particles having an average grain size of 20 μm and CBN particles having an average grain size of 3 μm were mixed in a ratio of 2:1 and then comminuted. Then, 74% by volume of the comminuted CBN mixture, 9% by volume of WBN particles of grain sizes not exceeding 1 μm, 5.8% by volume of titanium carbide consisting of carbon and titanium in a molar ratio of 1:0.68, 2.3% by volume of titanium nitride consisting of nitrogen and titanium in a molar ratio of 1:0.69, and 8.9% by volume of aluminum were mixed. The CBN particles contained in the resultant mixture had a continuous grain size distribution ranging from the maximum grain size of 23 μm to the minimum grain size of 1 μm. Subsequently, the procedure of Example 1 was faithfully repeated, except that the aforementioned mixed powder was used instead and the sintering conditions were changed to 42,000 atmospheres of pressure and 1,780° C. of temperature.

Figure 6:
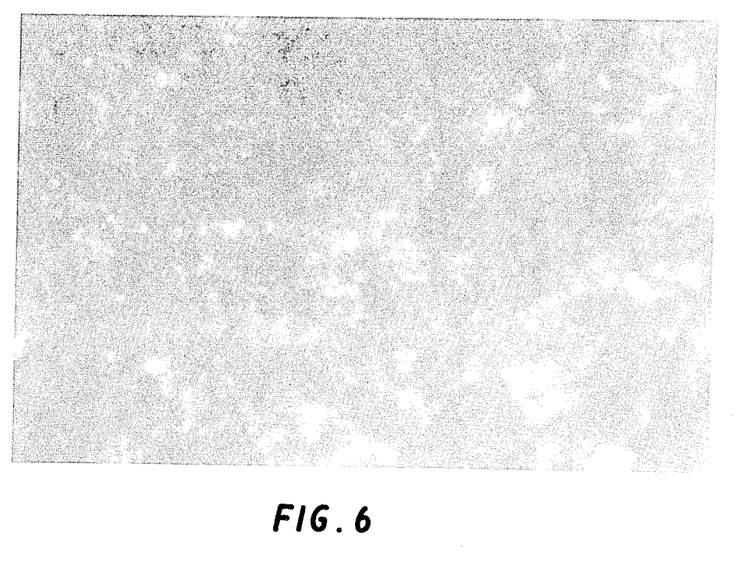
FIG. 6 is a photograph of the texture of a high-hardness sintered article of this invention prepared in Example 2, as taken through an optical microscope at 1,500 magnifications.
Figure 7:
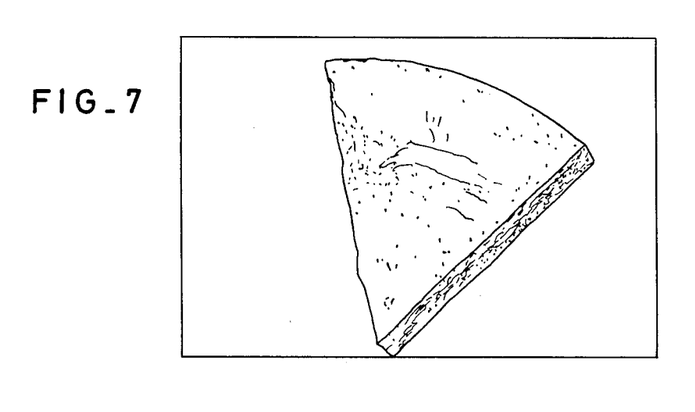
FIG. 7 is a diagram illustrating the condition assumed by the high-hardness sintered article of this invention prepared in Example 2 after immersion in the same mixture of hydrofluoric acid and nitric acid as used Example 1, as drawn based on a photograph taken through a microscope at about 10 magnifications.
Figure 8:
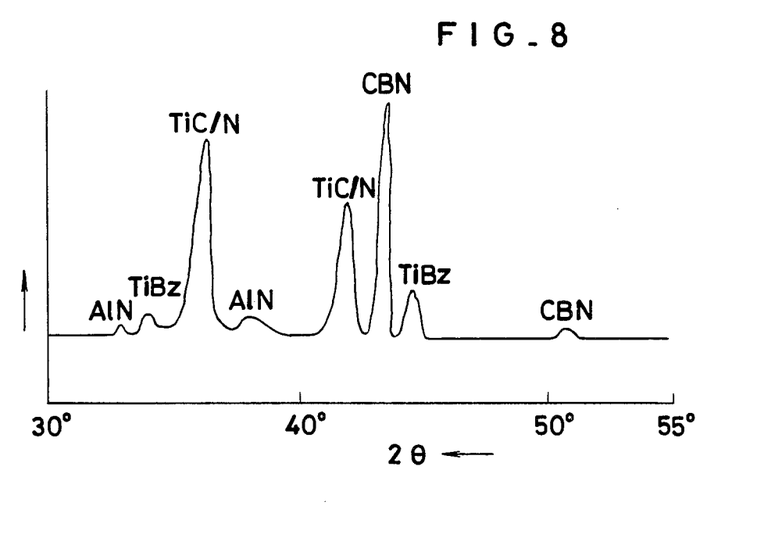
FIG. 8 is an X-ray diffraction diagram of the high-hardness sintered article of FIG. 6.
Figure 9:
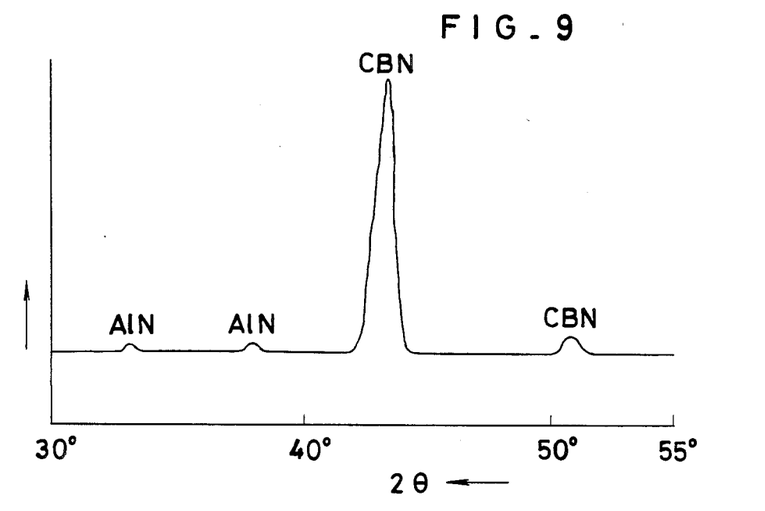
FIG. 9 is an X-ray diffraction diagram of the high-hardness sintered article of FIG. 7 after a chemical treatment.

The sintered article so obtained had a hardness of 4,300 kg/mm². The fact that the adjacent CBN particles were bound fast in the sintered article is clearly supported by the photograph of the texture of the sintered article taken through an optical microscope at 1,500 magnifications (FIG. 6) and by the diagram of the condition assumed by the sintered article after the chemical treatment with the same mixed mixture of hydrofluoric acid and nitric acid as used in Example 1, drawn based on a photomicrograph at about 10 magnifications (FIG. 7). This fact is further evidenced by the results of X-ray diffraction analysis. FIG. 8 shows the result of the X-ray diffraction analysis conducted on the sintered article before the chemical treatment and FIG. 9 the result after the chemical treatment. In FIG. 8, peaks of titanium diboride and titanium carbonitride are evident. In FIG. 9, these peaks are no longer detectable and only peaks of CBN and aluminum nitride can be recognized.

Although the sintered article contained WBN particles no discernible peak of WBN appeared in the X-ray diffraction diagram, because the amount of WBN added was small and because WBN produced only a weak diffraction pattern. The fact that WBN was still present in the sintered article after the chemical treatment has been confirmed by other tests.

The sintered article produced as described above was cut to produce throwaway tips by following the procedure of Example 1 and subjected to the cutting test. As a material for trial cutting, a bar of steel, S15C, having the same shape as the material used in Example 1 and not heat treated was prepared. The cutting was carried out under the conditions of V=433 m/min, d=0.5 mm, and f=0.2 mm/rcv for 3 hours 20 minutes. At the end of this cutting, the wear in the flank grew to 0.28 mm. The tips showed no discernible cracking or chipping, except for slight crater wear.

COMPARATIVE EXPERIMENT 3

A sintered article was produced by following the procedure of Example 2 faithfully, except that CBN particles having an average grain size of 3 μm were used as boron nitride.

The sintered article thus produced had a hardness of 3,800 kg/mm². When it was subjected to the same chemical treatment and the same test for hardness as in Example 1, it disintegrated under a load of 1 kg.

EXAMPLE 3

A high-hardness sintered article was obtained by following the procedure of Example 1, except that the mixture sealed in the capsule had incorporated therein 3.8% by volume of amorphous boron based on the mixture of Example 1 as 100% and the sintering conditions were changed to 25,000 atmospheres of pressure and 1,400° C. of temperature.

The sintered article thus obtained had a hardness of 4,350 kg/mm². The results of observation under an microscope, the chemical treatment, and the test for hardness after the chemical treatment all indicated that the CBN particles in the sintered article were bound fast to one another.

The cutting test was carried out for 60 minutes under the same conditions as in Example 1, except that the peripheral speed was increased, V=201 m/min. Despite the harsher conditions, the wear in the flank was 0.08 mm, the same as in Example 1. The cutting tip showed substantially no discernible cracking or chipping. It showed only slight crater wear and was judged to be usable for interrupt cutting.

COMPARATIVE EXPERIMENT 4

A sintered article was obtained by faithfully repeating the procedure of Example 1, except that CBN particles having an average grain size of 5 μm were exclusively used.

The sintered article thus produced had a hardness of 3,800 kg/mm². The results of observation under an optical microscope and the test after the chemical treatment all indicated that mutual bonding of CBN particles was totally or substantially absent.

In the cutting test performed similarly to that of Example 3, the cutting tip showed breakage within only 8 minutes after the start of cutting. When the same cutting test was repeated twice, the breakage of the cutting tip occurred in 5 minutes and 10 minutes 30 seconds respectively.

EXAMPLES 4–10

Sintered articles were produced by following the procedure of Example 1, except that the CBN content, the composition of additives, and the sintering pressure and temperature were varied as shown in Table 1 and Table 2. These sintered articles were subjected to the same chemical treatment as performed in Example 1, to confirm that, in these sintered articles, the CBN particles were bound fast to one another to form a continuous matrix. These sintered articles were properly prepared and subjected to the same cutting test as in Example 2. The results are shown in Table 3.

TABLE 1

| Example number | (volume %) | | | | | | |
|---|---|---|---|---|---|---|---|
| | CBN | TiC | TiN | TiC/N | TaC | TaN | TaC/N | Al |
| 4 | 91.8 | | | 3 | 1.4 | | | 3.8 |
| 5 | 65.9 | 10.3 | 8.3 | | | 4.2 | | 11.3 |
| 6 | 72.0 | | | 18.3 | | | | 9.7 |
| 7 | 73.2 | | 15.5 | | | | | 11.3 |
| 8 | 90.5 | | | 4.2 | 0.9 | | 2.1 | 2.3 |
| 9 | 68.3 | 13.2 | 7.1 | | | | | 11.4 |
| 10 | 82.8 | 6.0 | | | 4.2 | 2.0 | | 5.0 |

The molecular weight ratios between metals and carbon or nitrogen in the carbides, nitrides, and carbonitrides were invariably in the range of 1:0.65 to 1:1.

TABLE 2

| Example No. | Sintering pressure (atmospheres) | Sintering temperature (°C.) |
|---|---|---|
| 4 | 55,000 | 1,780 |
| 5 | 32,000 | 1,520 |
| 6 | 42,000 | 1,600 |
| 7 | 28,000 | 1,480 |
| 8 | 52,000 | 1,780 |
| 9 | 22,000 | 1,420 |
| 10 | 45,000 | 1,700 |

TABLE 3

| Example No. | Cutting time (min.) | Wear in flank(mm) | Change in appearance |
|---|---|---|---|
| 4 | 220 | 0.18 | No chipping or cracking |
| 5 | 80 | 0.26 | No chipping or cracking, slight crater wear |
| 6 | 160 | 0.26 | No chipping or cracking, slight crater wear |
| 7 | 110 | 0.23 | No chipping or cracking, slight crater wear |
| 8 | 210 | 0.19 | No chipping or cracking |
| 9 | 140 | 0.22 | No chipping or cracking |
| 10 | 180 | 0.20 | No chipping or cracking |

It is noted from Table 3 that the sintered articles produced by the method of this invention in the examples described above gave highly satisfactory results in the cutting test.

COMPARATIVE EXPERIMENTS 5–11

Sintered articles were produced by faithfully following the procedures of Examples 4, 5, 6, 7, 8, 9, and 10, except that CBN particles having substantially uniform grain size distributions averaging 3 μm were exclusively used. The sintered articles were subjected to the same cutting tests of the same examples under the respectively identical conditions. The results are shown in Table 4.

TABLE 4

| Comparative Experiment No. | Cutting time (min) | Wear in flank (mm) | Change in appearance |
|---|---|---|---|
| 5 | 50 | Not measurable | Serious breakage of cutting edge impeded measurement of wear |
| 6 | 20 | Not measurable | Separation of rake face impeded measurement of wear |
| 7 | 35 | 0.38 | Minute chipping occurred in part of cutting edge |
| 8 | 60 | 0.35 | A minute separation occurred on the rake face |
| 9 | 10 | Not measurable | Serious breakage of cutting edge impeded measurement of wear |
| 10 | 15 | 0.52 | Rounding of cutting edge by wear impeded continued cutting |
| 11 | 60 | 0.18 | Numerous chipping occurred on cutting edge, producing a rough surface on the specimen and making further cutting impossible |

This sintered artricles obtained in Examples 4–10 are similar to those obtained in Comparative Experiments 5–11 in all respects except for the grain size of CBN particles. In spite of this similarity, it is evident that they are entirely different in quality as shown in Table 3 and Table 4.

It is known that the sintered article containing high-pressure phase boron nitride obtained by the conventional technique manifests notable performance in the cutting of iron type materials as compared with other conventional cutting tools. The sintered article of the present invention manifests further excellent performance. It excels the conventional sintered article containing high-pressure phase boron nitride in the high-speed interrupt cutting of quenched high-hardness steels, the heavy cutting and high-speed cutting of green and quenched materials of cast steels, cast irons, and die steels, and the high-speed cutting of sintered metals. It also is useful for the cutting of low-carbon through high-carbon steels for which the conventional sintered article containing high-pressure phase boron nitride had been held as unfit and, in fact, has failed to give satisfactory results of cutting. This invention provides a sintered article for tools which are capable of high-speed interrupt cutting of high-hardness quenched steel materials and green steel materials under harsh conditions which cannot be withstood by the conventional sintered article containing CBN and/or WBN. Thus, the present invention contributes immensely to industry.

What is claimed is:

1. A sinterable composition, comprising:
 (A) 65 to 95% by volume of a high-pressure phase boron nitride consisting of a cubic phase boron nitride alone or a cubic phase boron nitride containing 5 to 30% by volume, based on the total amount of boron nitride, of a wurtzite type boron nitride;

(B) 4 to 34% by volume of an additive selected from the group consisting of
  (a) at least one member selected from the group consisting of carbide, nitride, and carbonitride of titanium and
  (b) a mixture of at least one member selected from the group consisting of carbide, nitride, and carbonitride of titanium with at least one member selected from the group consisting of carbide, nitride, and carbonitride of tantalum; and
(C) the balance of up to 100% by volume of aluminum and unavoidable impurities, said cubic phase boron nitride having a continuous grain size distribution ranging from a maximum grain size of 10 to 50 μm to a minimum grain size of less than 1 μm, said grain size distribution further characterized that when all of the particles of grain sized exceeding 1 μm are classified in stepped units of 5 μm, at least one particle of a grain size belonging to a given class is present in a total of 100 particles, and the number of particles of a grain size not exceeding 1 μm accounting for not less than 10% of the number of particles of grain sizes not smaller than 1 μm, said particles of boron nitride being bound to form a continuous matrix.

2. The sinterable composition according to claim 1, wherein said additive is at least one member selected from the group consisting of carbides, nitrides, and carbonitrides of titanium, said additive forming $TiB_2$ when said composition is sintered.

3. The sinterable composition according to claim 1, which further comprises the addition of from 0.1 to 5% by volume of boron based o the mixture as 100%.

4. The sinterable composition according to claim 3, wherein said additive is at least one member selected from the group consisting of carbides, nitrides, and carbonitrides of titanium, said additive forming $TiB_2$ when said composition is sintered.

5. A method for the manufacture of a high-hardness sintered article, of substantially hardness, which method comprises preparing a mixture of
(A) 65 to 95% by volume of a high-pressure phase boron nitride consisting of a cubic phase boron nitride alone or a cubic phase boron nitride containing 5 to 30% by volume, based on the total amount of boron nitride, of a wurtzite type boron nitride having a continuous grain size distribution ranging from a maximum grain size of 10 to 50 μm to a minimum grain size of less than 1 μm, said grain size distribution further characterized that when all of the particles of grain sizes exceeding 1 μm are classified in stepped units of 5 μm, at least one particle of a grain size belonging to a given class is present in a total of 100 particles and the number of particles of a grain size not exceeding 1 μm accounting for not less than 10% of the number of particles of grain sizes not smaller than 1 μm, said high-pressure phase boron nitride particles being bound to form a continuous matrix with
(B) 4 to 34% by volume of an additive selected from the group consisting of
  (a) at least one member selected from the group consisting of carbide, nitride, and carbonitride of titanium and
  (b) a mixture of at least one member selected from the group consisting of carbide, nitride, and carbonitride of titanium with at least one member selected from the group consisting of carbide, nitride, and carbonitride of tantalum; and
(C) the balance to make up 100% by volume of aluminum, and then sintering said mixture under conditions of at least 1,200° C. and 20,000 atmospheres, thereby forming a continuous matrix made up of mutually bound high-pressure phase boron nitride particles.

6. The method according to claim 5, wherein said additive is at least one member selected from the group consisting of carbides, nitrides, and carbonitrides of titanium which give rise to $TiB_2$ during the course of sintering.

7. The method according to claim 5, wherein said mixture further comprises the addition of from 0.1 to 5% by volume boron based on said mixture as 100%.

8. The method according to claim 7, wherein said additive is at least one member selected from the group consisting of carbides, nitrides and carbonitrides of titanium which give rise to $TiB_2$ during the course of sintering.

9. A sintered article of very substantial hardness prepared by sintering the composition of claim 1.

* * * * *